United States Patent [19] [11] 4,004,682
Schuler [45] Jan. 25, 1977

[54] TYPE S CHAIN
[75] Inventor: Stephen H. Schuler, Brighton, Mass.
[73] Assignee: Adamation, Inc., Newton, Mass.
[22] Filed: Aug. 14, 1975
[21] Appl. No.: 604,728
[52] U.S. Cl. .............................. 198/852; 74/250 C; 104/172 B; 198/853
[51] Int. Cl.² ......................................... B65G 17/00
[58] Field of Search ...... 198/189; 74/250 R, 250 C; 104/172 B

[56] References Cited
UNITED STATES PATENTS
2,182,443 12/1939 McAninch .................... 198/189 X
3,334,726 8/1967 Fredrikson .................... 198/189
3,768,631 10/1973 Wahren ........................ 74/250 C FOREIGN PATENTS OR APPLICATIONS
767,567 2/1967 United Kingdom ............... 198/189

Primary Examiner—Evon C. Blunk
Assistant Examiner—Douglas D. Watts
Attorney, Agent, or Firm—Richard L. Stevens

[57] ABSTRACT

A conveyor chain for a dishwasher conveyor which is adapted for movement in two directions. The links are pinned such that there is relative oscillatory movement in the horizontal plane and also pivotal motion in a vertical plane. The links include rollers which contact a conveyor pan and a limited top surface to carry trays. The top surface is designed such that if a tray is obstructed, the conveyor chain will continue to run.

9 Claims, 5 Drawing Figures

TYPE S CHAIN

BACKGROUND AND BRIEF SUMMARY OF THE INVENTION

Conveyors used in dishwashing machines and dish collection and distribution systems are either a continuously running type, such as disclosed in U.S. Pat. No. 3,237,755, or a continually running type with a manual or automatic stop motion mechanism which stops the conveyor when an article being carried is obstructed. Most conveyors are adapted to travel in a straight line and their connecting links are capable of movement in a vertical plane. Conveyors are also available which turn in a horizontal plane, and their links are pinned and turn about a vertical axis.

Further, conveyors are available in which their links are pinned for movement in both horizontal and vertical planes. These conveyors are supported by a conveyor pan. When trays are placed on the conveyor the bottom of the conveyor or knuckle chain engages the conveyor pan resulting in sliding friction and a wear pattern. To overcome this problem, wear strips are placed in the conveyor pan. Also, the trays being carried, if obstructed, will tend to pile one on top of the other.

The present invention is directed to a conveyor chain adapted to turn in both horizontal and vertical planes, which chain eliminates sliding friction between the chain and the conveyor pan. The conveyor chain also employs a limited upper surface which carries trays but avoids piling one on top of the other in the event a tray is obstructed.

In a preferred embodiment of my invention, a conveyor chain is comprised of a plurality of links, each link engaged to the next link such that there is both oscillatory motion between links about a vertical axis and pivotal movement in a vertical plane about a horizontal axis which passes through the vertical axis.

In the preferred embodiment of the invention, a plurality of links form an endless conveyor chain. The chain is driven in a vertical plane by sprockets. Each link comprises a collar and a yoke joined by a web. The yoke receives the collar of the next link and a sleeve is received within the collar. The vertical axis about which the links oscillate is coincident with the sleeve axis. A roller is secured in the sleeve to provide rolling friction between the chain and a supporting conveyor pan. The sleeve is characterized by a reduced upper surface which surface is adapted to carry the trays but allows the chain to continue running in the event the trays or other articles are obstructed. More specifically, the sleeve includes a dome-shaped or arcuate upper surface which engages with a sliding friction the trays to be carried. The links are pinned together to form an endless chain. The pins serve as shafts for the rollers, and the horizontal axis about which the links pivot is coincident with the axis of the pin.

DESCRIPTION OF THE PREFERRED EMBODIMENT

Figure 1:
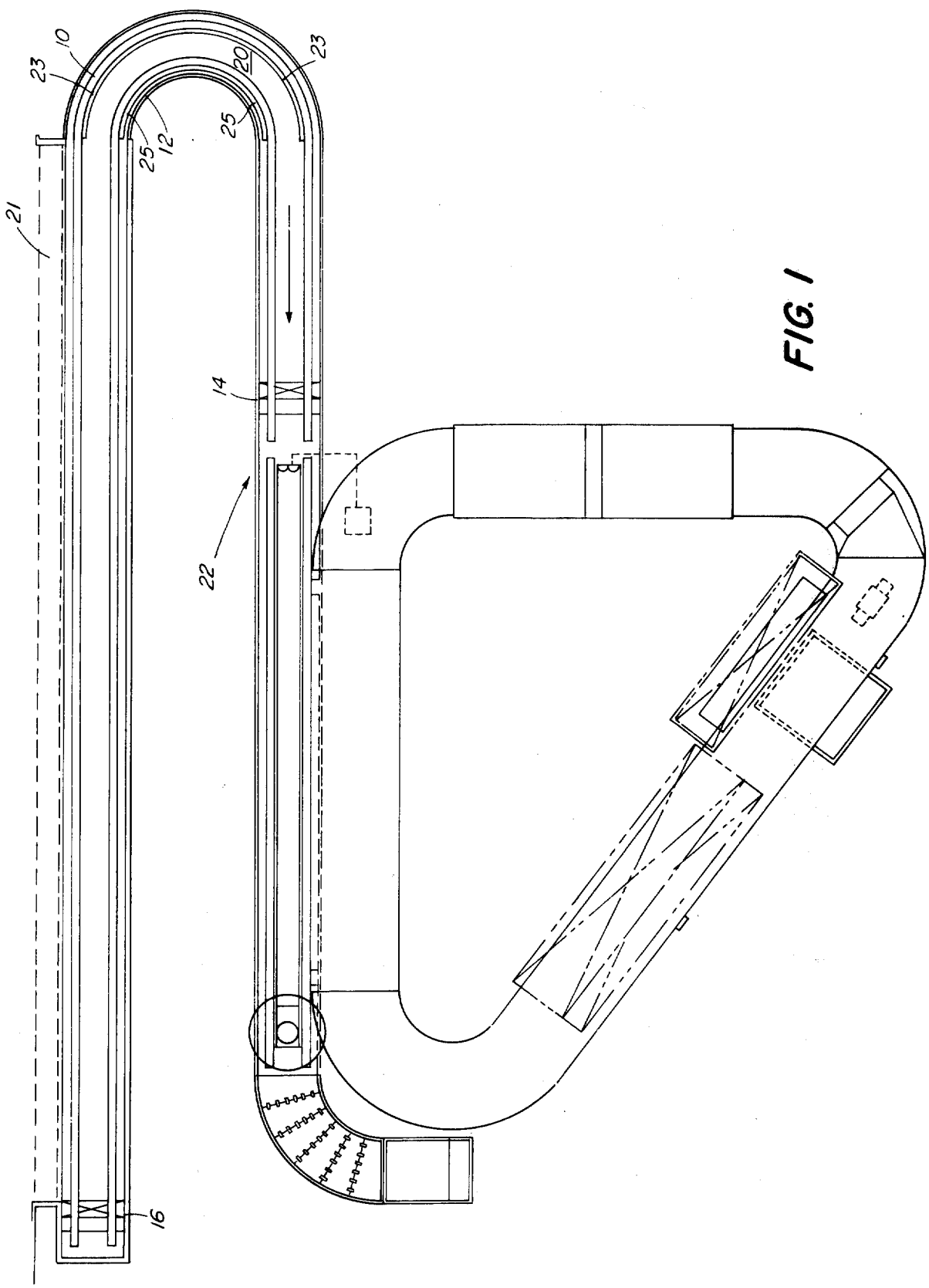
FIG. 1 is a plan view of a dishwashing system utilizing a conveyor chain embodying the invention.

Referring to FIG. 1, a dishwashing system is shown wherein two endless conveyor chains 10 and 12 are shown engaged at one end to a drive sprocket assembly 14 and at the other end to an idler sprocket assembly 16. The chains are supported by a conveyor pan 20 and travel between a load station 21 and an unload station or pre-wash area 22. The conveyor pan 20 includes an arcuate section and therefore the path traveled by the chains 10 and 12 is nonlinear. The chains travel adjacent chain guides 23 and 25 which maintains the proper spacing of the chains 10 and 12 respectively as they travel through the arcuate section.

Figure 2:
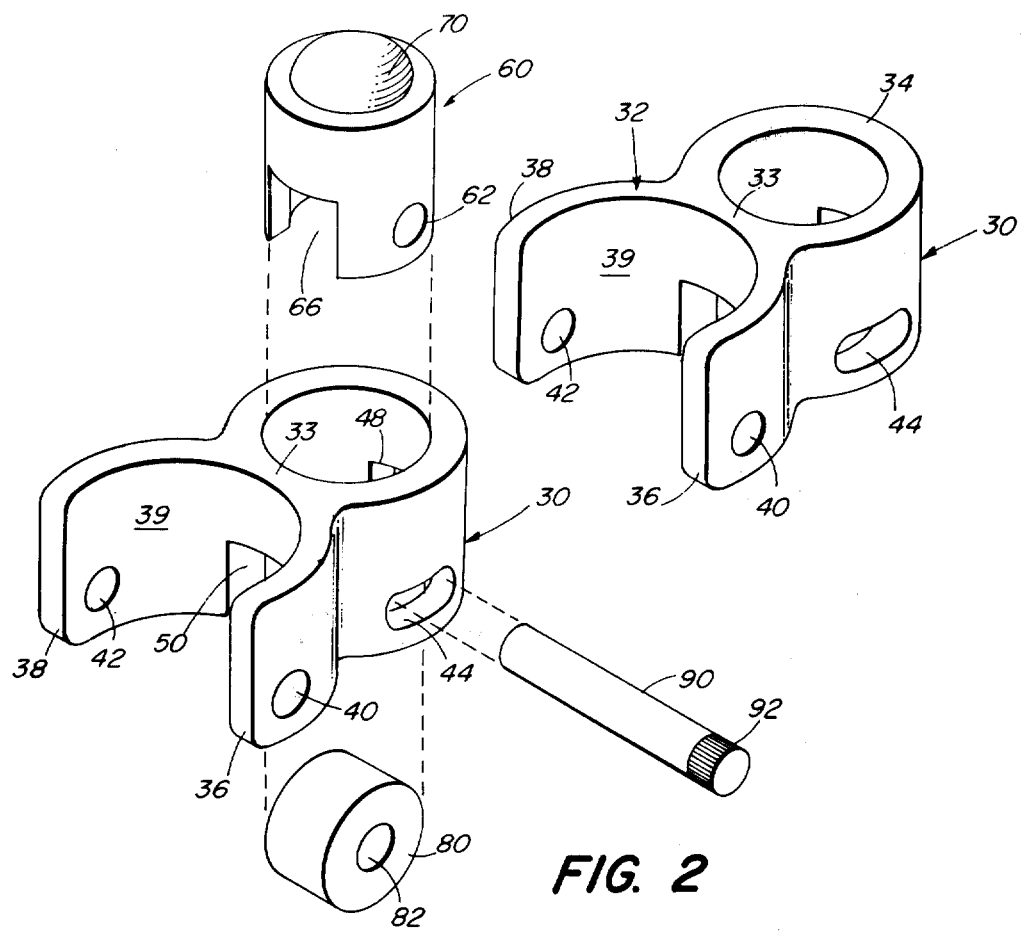
FIG. 2 is a telescopic perspective view of two links of the conveyor chain.
Figure 4:
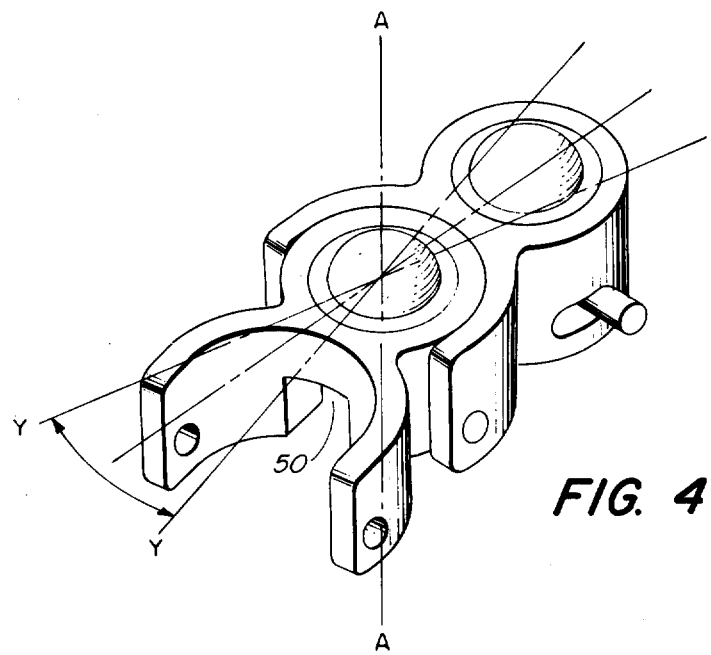
FIG. 4 is a perspective illustration of the movement of two links in the horizontal plane.
Figure 5:
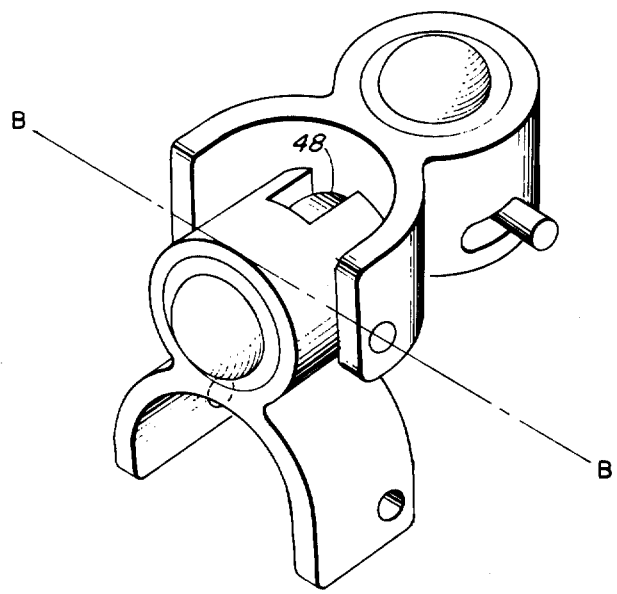
FIG. 5 is a perspective illustration of the movement of two links in the vertical plane.

In FIG. 2, a section of the conveyor chain 10 is shown in greater detail and comprises links 30 which include a yoke 32 and collar 34 joined by a web 33. The yoke 32 has arms 36 and 38, which arms form a concave surface 39 having opposed holes 40 and 42 in register. The collar portion 34 includes opposed slots 44. Opposed openings or clearance spaces 48 and 50, shown most clearly in FIGS. 4 and 5, are formed in the wall of the collar 34 and the web 33.

A sleeve 60 includes opposed holes 62, opposed openings 66 and a dome-shaped top 70. The sleeve is rotatably received within the collar 34. A roller 80 having a hole 82 in the center thereof is received within the sleeve 60.

To assemble the chain (shown assembled in FIGS. 4 and 5) the collar 34 of one link 30 is embraced by the arms 36 and 38 of the next link. The sleeve 60 is inserted in the collar 34 and the roller 80 is received within the sleeve 60. A pin 90 having a knurled edge 92 passes through hole 40, slot 44, hole 62, and hole 82 of the roller 80 and then through hole 62 (not shown), slot 44 (not shown), and hole 42. The knurled end 92 of the pin 90 is forced into the hole 40 such as in a press fit to secure the links together. When assembled, the roller 80 rotates about the pin 90.

Figure 3:
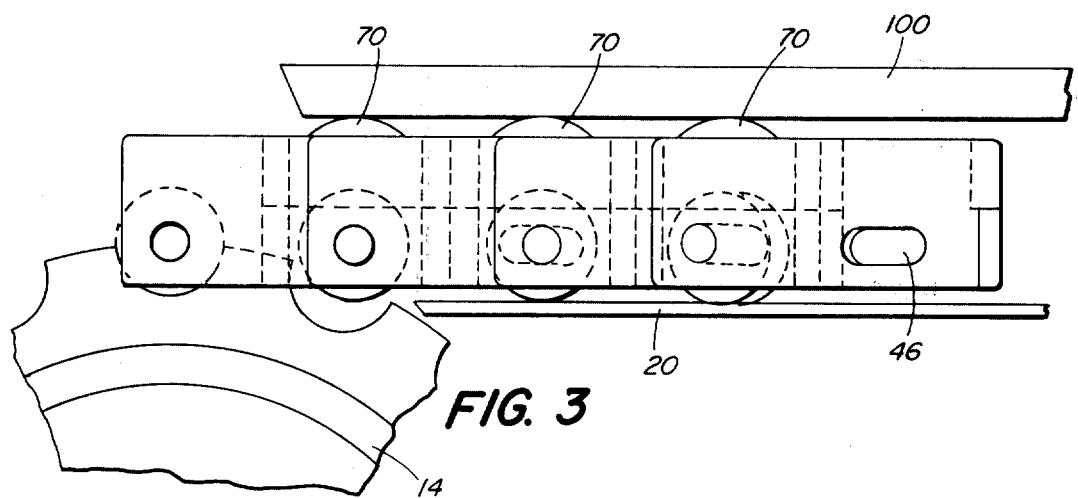
FIG. 3 is a front elevation of the conveyor chain carrying an article and contacting a conveyor pan.

Referring to FIG. 3, the chain 10 and the sprocket 14 are shown more clearly. The friction between the surfaces 70 and the tray 100 is so low that a succeeding tray which runs into the stationary tray will stop without riding up. Also, if a tray is stopped, the chain will run freely under it.

Referring to FIG. 4, the sleeve 60 is pinned to the arms 36 and 38 of the link 30. When in a horizontal plane, there is relative oscillatory movement between the collar 34 on the one hand the arms 36 and 38 and sleeve 60 on the other hand. This movement is limited by the dimensions of the slots 44 and 46 through which the pin 90 passes. In this embodiment, the movement is about the axis A—A between points Y—Y.

Referring to FIG. 5, the pinned collar 34, the sleeve 60, and the roller 80 of the link 30 are adapted for downward vertical pivotal movement. Upward vertical motion is prevented by the abutting of the outer surface of the collar against the inner arcuate surface of the arms. Downward motion is allowed by the aligned openings 48 of the collar 34 and the adjacent opening 50 in the web 33. These openings 50 and 48 together with the adjacent openings 66 of the sleeve 60 form a recess into which the sprocket teeth are received. The pivotal motion is about the horizontal axis B—B, which axis passes through the pin 90. Therefore, there can be oscillatory motion between links within the plane Y—Y from the horizontal downwardly. Accordingly, two direction movement is provided. The chain may move downwardly or sag to a slight degree. Stated otherwise, adjacent links may bend upward slightly because of the inherent clearances between the mating parts.

Chains of the described construction can be assembled in any desired length using the four basic parts; link, sleeve, roller, and pin. The composition of the roller and link is preferably a polyoxymethylene thermoplastic polymer such as Celcon™. The composition of the sleeve is preferably an admixture of Celcon™ and a fluorocarbon polymer, such as tetrafluoroethylene in a ratio of about 95:5. The use of dissimilar compositions minimizes friction between the sleeve and the collar within which it is received. Also, the domed top of the sleeve limits friction with the trays that are carried and allows the chain to accumulate trays without driving them on top of each other. The chain has an equal number of rollers, and the rollers are equally spaced such that the conveyor has the same area of bearing surface and a load is evenly distributed.

For many installations, a complete conveyor consists of a pair of chains such as that just described, spaced apart by less than the width of the articles to be carried, and driven in unison. If the articles are wide, or for any other reason, it is desirable to support them at more than two points, or if the conveyor is to be used for articles of varying widths, any number of chains spaced according to the requirements of the installation may be used.

When in operation, the conveyor runs continuously. The device eliminates the need for complicated automatic controls, and frequent stopping and restarting which puts a considerable strain in the drive motors when the conveyor is heavily loaded. If one tray stops, others behind it will come to rest without riding up on each other and causing breakage of dishes. A tray may be held stationary at either end of the conveyor for the length of time necessary for any operation. For example, when such a conveyor is used to carry racks of clean dishes from the dishwasher to a storage area, an operator at the delivery end can unload and put away the dishes and place the empty rack on the return run. Another operator can remove the collected empty racks at the return end whenever convenient without interfering with the unloading operation.

Having described my invention, what I now claim is:

1. A dishwasher conveyor which comprises:
    a. a plurality of links, each link having an upper and lower surface and a yoke and a collar connected integrally therewith; the collar adapted to be rotatably received within the yoke of a next successive link; the collar of the link including opposed slots which define the limits of relative oscillatory movement about a first axis between the collar and the next successive link; and wherein the collar of one link includes an opening adjacent to an opening of the collar of the next successive link to allow maximum pivotal movement therebetween about a second axis and wherein the openings define a recess, which recess receives the tooth of a sprocket;
    b. a sleeve rotatably received within the collar of the yoke, the sleeve having an upper domed surface which extends beyond the upper surface of the link;
    c. a wheel-like roller having a hole in the center thereof received in the sleeve and extending below the lower surface of the link; and
    d. means to secure the collar of one link to the yoke of the next link and the sleeve and the roller to the collar portion, the secured links adapted for relative oscillatory motion one to the other about the first axis, which motion is limited by the slots in the collar and for pivotal motion about the second axis.

2. The conveyor chain of claim 1, wherein the first axis is a vertical axis and the second axis is a horizontal axis, and the one link with respect to the next link may oscillate about the vertical axis at any point of the pivotal movement of the link about the horizontal axis in the vertical plane.

3. The conveyor chain of claim 1, wherein the collar, sleeve, and wheel are pinned to the yoke of the next successive link, and wherein the horizontal axis is coincident with the center line of said pin.

4. The conveyor chain of claim 1 wherein the composition of the link is a polyoxymethylene thermoplastic polymer and the composition of the sleeve is an admixture of a polyoxymethylene thermoplastic and a fluorocarbon polymer, in a ratio of between about 95:5.

5. A dish collection and distribution system for transporting trays which comprise:
    a. a conveyor pan which includes an arcuate section and which pan is adapted to support conveyor chains;
    b. at least one continuous conveyor chain supported by the conveyor pan, the conveyor chain including a plurality of links, each link having an upper and lower surface and a yoke and a collar connected integrally therewith; the collar adapted to be rotatably received within the yoke of a next successive link; the collar of the link including opposed slots which define the limits of relative oscillatory movement about a first axis between the collar and the next successive link; and wherein the collar of one link includes an opening adjacent to an opening of the collar of the next successive link to allow maximum pivotal movement therebetween about a second axis and wherein the openings define a recess, which recess receives the tooth of a sprocket;
    a sleeve rotatably received within the collar of the yoke, the sleeve having an upper domed surface which extends beyond the upper surface of the link;
    a wheel-like roller having a hole in the center thereof received in the sleeve and extending below the lower surface of the link; and
    means to secure the collar of one link to the yoke of the next link and the sleeve and the roller to the collar portion, the secured links adapted for relative oscillatory motion one to the other about the first axis, which motion is limited by the slots in the collar and for pivotal motion about the second axis; and
    c. sprocket means to drive the conveyor chain whereby the conveyor chain travels on the conveyor pan.

6. The system of the claim 5, wherein the sprocket means includes a drive sprocket and an idler sprocket, which sprockets engage the conveyor chain and define the unilateral length of travel of the conveyor chain.

7. The system of claim 5, wherein the first axis is a vertical axis and the second axis is a horizontal axis, and the one link with respect to the next link may oscillate about the vertical axis at any point of the pivotal movement of the link about the horizontal axis in the vertical plane.

8. The system of claim 5, wherein the composition of the link is a polyoxymethylene thermoplastic polymer and the composition of the sleeve is an admixture of a polyoxymethylene thermoplastic and a fluorocarbon polymer, in a ratio of between about 95:5.

9. The system of claim 5, wherein the collar, sleeve, and wheel are pinned to the yoke of the next successive link, and wherein the horizontal axis is coincident with the center line of said pin.

* * * * *